Oct. 21, 1969  T. HOPKA ET AL  3,473,201
SEAT BELT BUCKLE

Filed Jan. 3, 1967  2 Sheets-Sheet 1

INVENTORS
THOMAS HOPKA
ROBERT W. STOFFEL
BY Hauke, Krass, & Gifford
ATTORNEYS

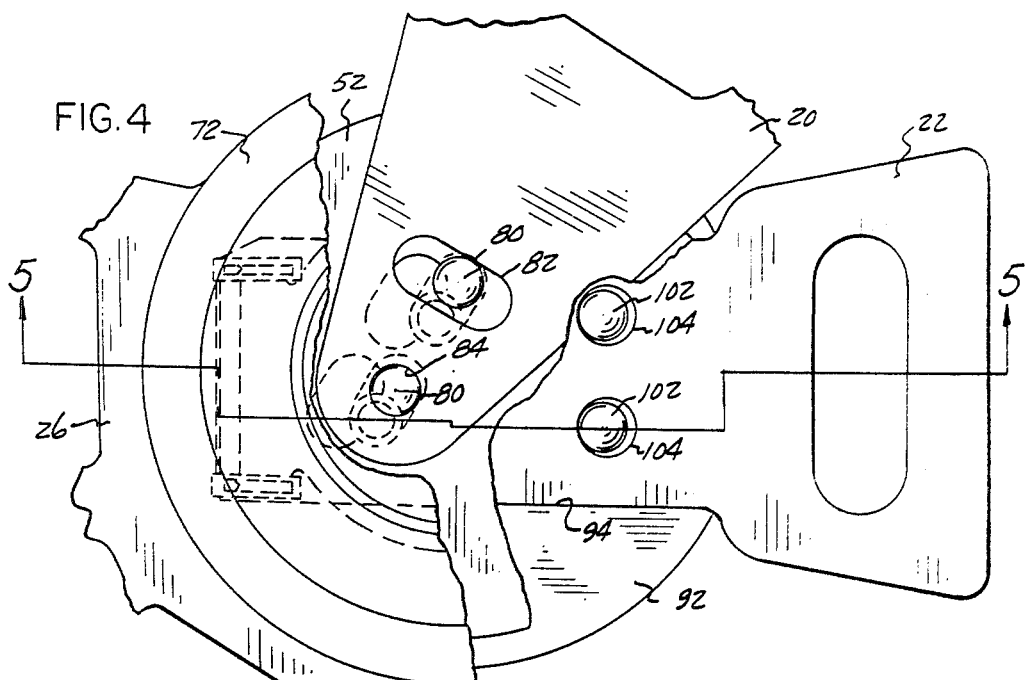
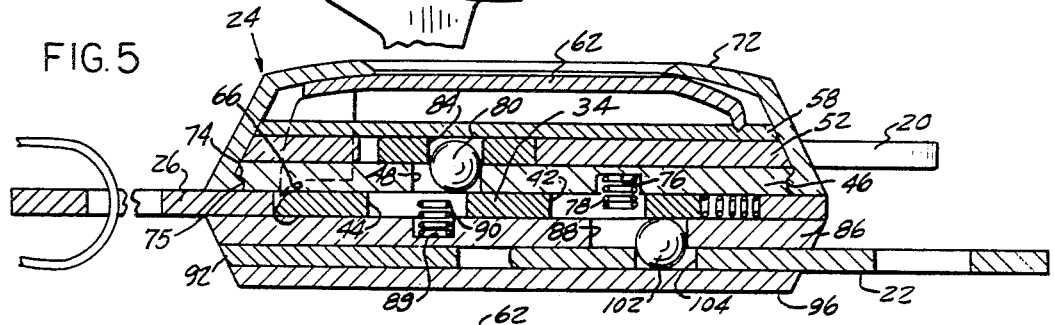
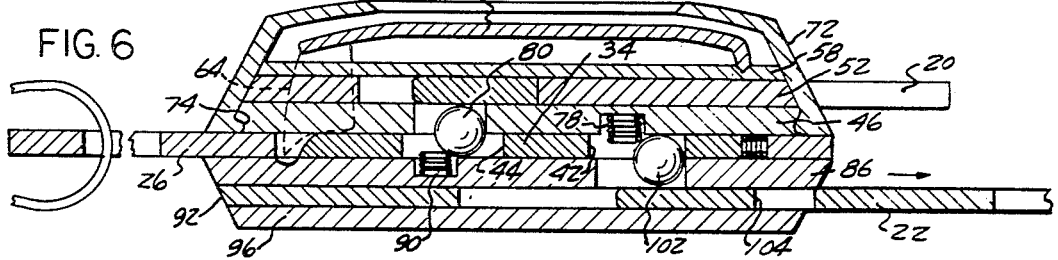
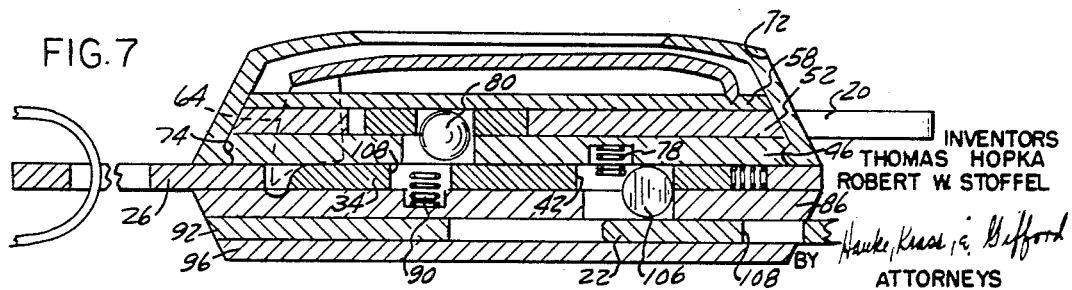

United States Patent Office 3,473,201
Patented Oct. 21, 1969

3,473,201
SEAT BELT BUCKLE
Thomas Hopka, Belleville, and Robert W. Stoffel, Ferndale, Mich., assignors to Jim Robbins Seat Belt Company, Royal Oak, Mich., a corporation of Delaware
Filed Jan. 3, 1967, Ser. No. 606,991
Int. Cl. A44b 17/00, 19/00
U.S. Cl. 24—205.17
22 Claims

ABSTRACT OF THE DISCLOSURE

A seat belt buckle housing having a pair of locking elements each adapted to lockingly receive a complementary tongue section. Each locking element independently engages its associated tongue section. A push button actuated release member provides for independent disengagement of the tongue sections from the housing. each locking element is a rotatable member displaceable in a plane parallel to the relative movement of the housing and its associated tongue section between a tongue engaging position and a tongue locking position. In the tongue engaging position, each locking element is displaceable in a lateral direction to permit insertion of the tongue in the housing and then movable to the tongue locking position upon the application of a force tending to separate the tongue from the housing. The release member is operable upon application of an intentional force to permit lateral displacement of the locking element relative to its associated tongue section so that the tongue section is disengaged from the housing.

BACKGROUND OF THE INVENTION

Field of the invention

This invention is related to safety seat belt buckle mechanisms and more specifically to a buckle mechanism for releasably coupling at least three buckle sections, including a housing section and a pair of complementary tongue sections. A push-button actuated release member provides for individual separation of each of the tongue sections from the housing section.

Description of the prior art

Increased public interest in automotive safety devices in recent years has resulted in Federal legislation establishing mandatory safety features in automotive vehicles. One area in which this interest has focused itself includes restraint systems for limiting relative displacement of the occupant of a vehicle from his seat upon a sudden deceleration of the vehicle.

One popular restraining system has taken the form of a combination lap belt and shoulder harness. Usually the lap belt includes a pair of belt halves each having an extreme end anchored to the vehicle and means for releasably coupling their free ends across the lap of the occupant. The conventional shoulder harness takes the form of a second pair of belt halves coupled to one another by a second buckle mechanism and arranged to pass over the back of the seat and then down over one shoulder and diagonally across the torso of the occupant.

The disadvantages of this type of arrangement are twofold, first the occupant has a difficult, time consuming process joining the belt halves in their proper companion sections. In addition, the occupant has to disengage two separate buckle mechanisms when he desires to leave his position in the vehicle.

One approach to this problem, disclosed in the prior art in Patent No. 3,233,941 issued to J. V. Selzer, February 8, 1966, takes the form of a buckle mechanism wherein the tongue sections of each of the belt halves are joined together in a common housing. Although this approach reduces the total number of buckle sections required in a lap and shoulder harness restraining system, it has serious shortcomings which are the primary objects of the present invention to obviate.

One problem of the buckle mechanim described in the aforementioned Selzer disclosure is associated with the spring-loaded locking member carried by the female housing section and engageable with both of the male tongue members. The user is required to manually hold the first tongue section in a locked position so that the second tongue section can be engaged with the locking member. This cumbersome manipulation is obviated in the present invention by a buckle housing having independent locking elements associated with each of the tongue sections.

Another problem of the aforementioned approach to a multi-tongue buckle mechanism is that no means are provided to prevent the tongues from being inserted in the wrong tongue receiving section of the buckle housing. Thus, a narrow tongue could be inserted and engaged in a wide tongue receiving section of the buckle housing thereby producing serious difficulties when the user attempts to insert the opposite wide tongue in the housing.

Another disadvantage of the aforementioned multi-tongue buckle mechanism is that the locking means takes the form of a plurality of locking elements supported for pivotal movement by a pin supported in opposite sidewalls. The apertures in the sidewalls of the buckle housing associated with the supporting pin member reduce the stress-transfer capabilities of the buckle housing.

SUMMARY

The preferred embodiment of the present invention which will be subsequently described in greater detail, obviates the aforementioned problems in addition to providing some additional advantages in the form of a multi-tongue buckle section having increased reliability and improved stress-transfer characteristics.

The preferred buckle mechanism employs a female housing section providing a guideway for each tongue section in the form of a pair of spaced apart, overlapping, locking plate sections separated by a guide plate section. Each tongue section has an individual contour to match the contoured sidewalls of its corresponding guide plate. One locking plate of each guideway is slotted to form a pocket with a release plate common to both guideways.

A rotatable element is disposed in each of the pockets. Each locking element has a cross section greater than the thickness of its locking plate so that it normally extends into its guideway to provide an interference to the insertion of its associated tongue member.

Each locking element is movable between a tongue engaging position and a tongue locking position in a plane parallel to the direction of relative movement of the tongue member and the guideway. In the tongue-engaging position the locking element is movable in a lateral direction away from its guideway to a position wherein it registers in an aperture in the releasse plate so that the tongue section may be fully inserted in the guideway. When the tongue section is fully engaged, spring-bias means urge the locking element back into the guideway to engage a locking aperture in the tongue section. The application of a force tending to separate the tongue section from its guideway displaces the locking element and the tongue to the tongue-locking position wherein the release plate prevents a lateral displacement of the locking element out of the tongue aperture.

In order to permit separation of the buckle sections, the release plate is movable to a position wherein an aperture registers with the locking element to permit lateral displacement of the locking element away from the apertured tongue. The release plate is suitably apertured so that in one form of the invention, it provides means for simultaneously disengaging each of the tongue members and in another embodiment of the invention it provides an individual release of the tongue members.

In summary, the preferred embodiment of the invention provides means for independently engaging each of a plurality of tongued sections with the housing section. Thus the user need not be concerned about the simultaneous engagement of all the tongue sections. The individual profiling of the tongue sections provides means for insuring that the proper tongue section is mated with its corresponding guideway. The novel, floating, locking elements increase the stress-bearing characteristics of the buckle housing by reducing the number of stress-reducing apertures formed in the housing section in addition to providing a reliable locking mechanism, not subject to jamming or the like.

It is therefore an object of the present invention to provide a multi-tongue buckle mechanism having a structure that is relatively simple and economical to fabricate and which locks to easily absorb forces acting in diverse directions.

It is another object of the present invention to provide a multi-tongue buckle mechanism having means for individually locking each of the tongue sections to the housing section.

It is another object of the present invention to provide a multi-tongue buckle mechanism having a housing for accommodating a plurality of tongue sections and means preventing a mismatch between each of the tongues and its respective guideway by providing each of the tongue sections with an individual contour for engaging a correspondingly contoured guideway in the housing.

It is still a further object of the present invention to provide a coupling device for locking a pair of coupling sections including a female coupling section defining a guideway for receiving a male coupling section, a locking element carried by the female coupling having portions disposed in the guideway and movable in a direction corresponding to the relative movement of the two coupling sections between a first position wherein the locking element is movable transversely to permit the insertion of the male member in the guideway and a second position wherein transverse movement of the locking element out of disengagement with the male coupling section is restricted.

It is still a further object of the present invention to provide a coupling device having male and female coupling sections releasably engaged to one another and including a rotatable locking element displaceable to a first position wherein the locking element is resiliently, laterally movable out of the guideway accommodating the male coupling section and a second position wherein the locking element is captured by a movable release member and restricted from lateral displacement away from the guideway.

Still further objects and advantages of the present invention will readily occur to one skilled in the art to which the invention pertains upon reference to the following detailed description.

Description of the drawings

The description makes reference to the accompanying drawings in which like reference characters refer to like parts throughout the several views and in which:

FIGURE 4 is a fragmentary enlarged plan view of the buckle mechanism illustrated in FIGURE 1;

FIGURE 5 is a longitudinal sectional view taken along lines 5—5 of FIGURE 4 and illustrating both tongue sections locked in the housing section;

FIGURE 6 is a view similar to FIGURE 5 but with one of the locking elements laterally displaced from the guideway of one of the tongue sections to permit the withdrawal thereof; and FIGURE 7 is a longitudinal cross-sectional view through another buckle housing wherein the release plate is adapted to individually release the two tongue sections and wherein the two spaced apart ball locking elements associated with one of the tongue sections have been replaced by a single individual roller-type locking element.

Description of the preferred embodiments

Figure 1:
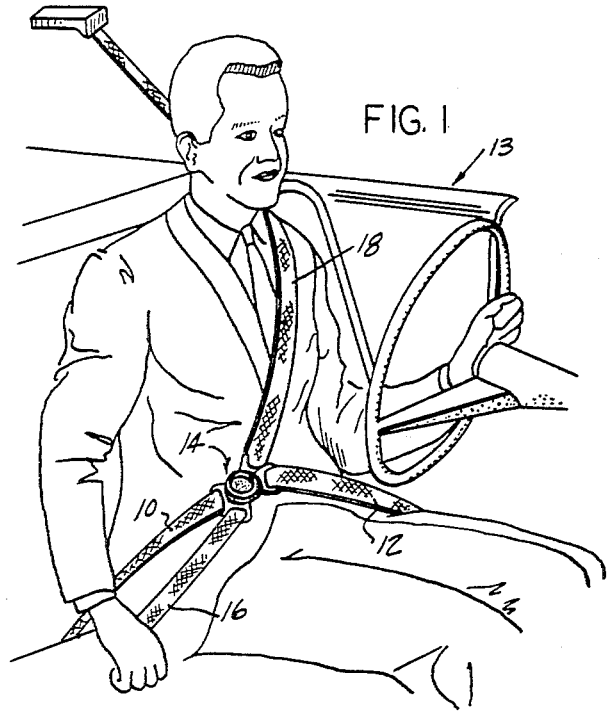
FIGURE 1 is a perspective view of a lap belt and harness arrangement interconnected by a buckle assembly formed in accordance with the present invention.

Now referring to the drawings a preferred restraining system comprises a pair of belt sections 10 and 12 arranged with their outer ends firmly anchored by means (not shown) to a fixed part of an automotive vehicle 13 and their free ends united by a preferred buckle mechanism 14. The system also includes a shoulder harness comprising a belt section 16 having its lower end anchored to the floor panel of the vehicle 13 and united to a companion belt section 18 having its upper end preferably anchored to a roof panel and slightly behind the seat.

Figure 2:
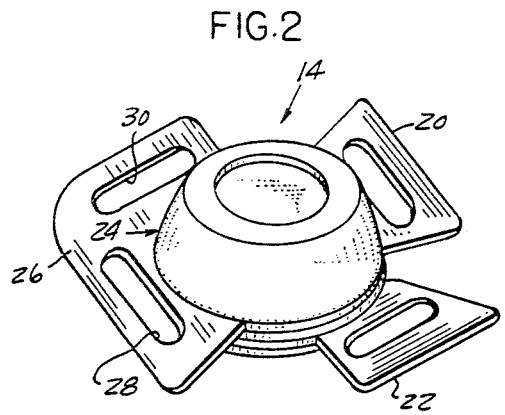
FIGURE 2 is an enlarged view of the buckle assembly illustrated in FIGURE 1.
Figure 3:
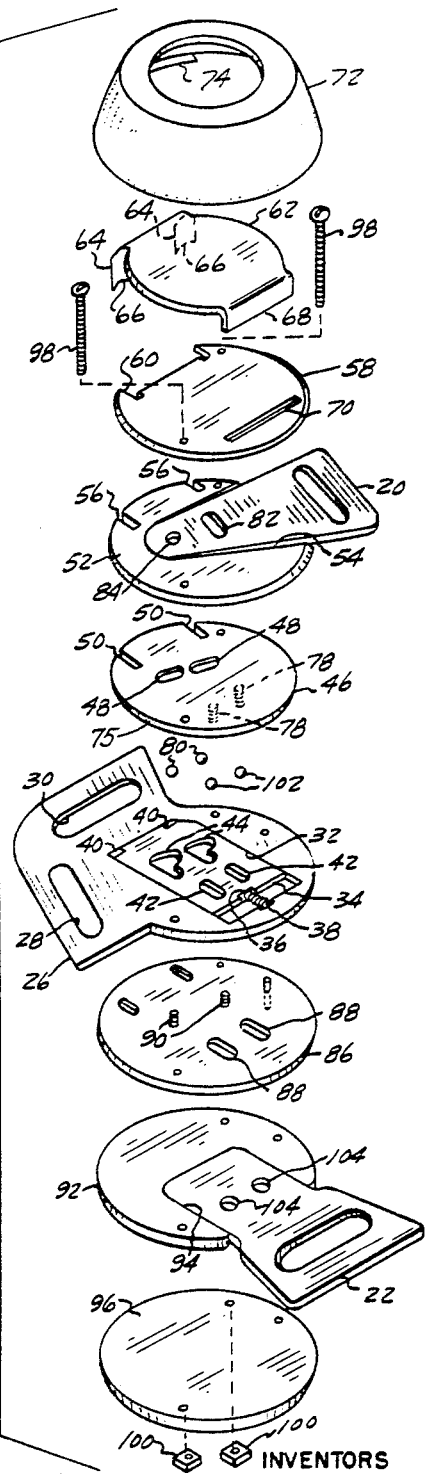
FIGURE 3 is an exploded perspective view illustrating the preferred buckle mechanism of FIGURE 1.

Referring to FIGURES 2 and 3, the shoulder belt section 18 is attached to a tongue section 20 and the lap belt section 12 is attached to a tongue section 22. Preferably the tongue section 20 is constructed from a flat piece of steel and has parallel sides. The tongue sections 20 and tongue section 22 is also constructed out of a flat piece of steel and has parallel sides. The tongue sections 20 and 22 are engaged in a buckle housing section 24. The housing section 24 includes an anchor plate 26 having a pair of angularly spaced elongated apertures 28 and 30 adapted to receive the looped terminal ends of the flat belt sections 16 and 10 respectively.

In order to effectively transfer belt forces through the buckle mechanism 14 it is preferable that the opposite belt halves be aligned with one another. Thus the apertures 28 and 30 are formed in the anchor plate 26 such that they are generally aligned with the axis of engagement of tongues 20 and 22 associated with the belt sections 18 and 12 respectively. The advantages of this arrangement lie in the fact that the user can effectively couple together the lap belt sections 10 and 12 without using the shoulder belt sections 16 and 18. Conversely, the user can couple together the shoulder belt sections in an effective manner without utilizing the lap belt sections 10 and 12.

The anchor plate 26 defines a generally rectangular aperture 32 to accommodate a release plate 34. The release plate 34 is dimensioned such that its shorter dimension corresponds to the width of the aperture 32 and its longer dimension is less than the length of aperture 32. The release plate has a recess 36 accommodating a spring-bias member 38 which normally urges the release plate toward the opposite edge of the aperture 32. The end of the release plate 34 is also provided with a pair of spaced apart arcuate cutouts 40.

The release plate 34 has a pair of spaced apart parallel, elongated slots 42 associated with the lap belt tongue section 22. The release plate also has a pair of heart shaped apertures 44 associated with the shoulder belt tongue section 20.

An upper locking plate 46 overlaps the aperture 32 of the anchor plate 26. The locking plate 46 defines a pair of elongated slots 48 in registry with the heart-shaped slots 44 of the release plate 34. The locking plate 46 also has a pair of circumferentially spaced slots 50 in registry with the arcuate cutouts 40.

An upper tongue plate 52 has a cutout 54 with side edges diverging at a wider angle than the side edges of the tongue 20. Thus the tongue 20, when mated with the tongue plate 52, has a degree of angular movement permitting its associated shoulder belt section 18 to accommodate occupants having different physical dimensions. The upper tongue plate 52 also has a pair of spaced apart slots 56 in registry with the slots 50 and the arcuate cutouts 40.

A top plate 58 is disposed over the tongue plate 52 and overlaps the cutout 54 so that the locking plate 46 the tongue plate 52 and the plate 58 define a tongue receiving recess for the tongue 20. The top plate 58 has a cutaway portion 60 associated with the slots 56, slots 50 and cutout portions 40.

A button member 62 has a pair of downwardly depending lugs 64 which are received by the cutout and slots 60, 56 and 50 to engage the arcuate cutouts 40 of the release plate 34. The lugs 64 have an arcuate engaging portion 66 which provides a sliding abutment with the cutouts 40.

The button 62 also has a downwardly depending pivot section 68 seated in an elongated groove 70 of the top plate 58. It is to be understood that the button 62 is pivotal about the pivot section 68 between lowered and raised positions wherein the engaging portions 66 produce a force on the release plate 34 through the cutouts 40 effective to move the release plate 34 between the engaging position illustrated in FIGURE 3 and a disengaging position wherein the release plate is moved against the spring bias member 38.

A housing member 72 having an internal partially circumferential lip section 74 is resiliently formed of a suitable plastic material so that the lip 74 snaps into a circumferential groove 75 in a locking plate 46. This engagment is best seen in FIGURE 5.

Still referring to FIGURE 5, the locking plate 46 has the pair of recesses 76, only one of which is shown, to seat a pair of spring members 78. Springs 78 depend downwardly to register in the slots 42 of the release plate 34. A ball-shaped locking element 80 is associated with the slots 48 and the heart-shaped cutouts 44. One of the locking elements 80 is engageable with an elongated aperture 82 in the tongue 20 and the other locking element is engageable with a second aperture 84 in the tongue member 20.

Now referring to FIGURES 3 and 5, a lower locking plate 86 overlaps the aperture 32 of the anchor plate 26 and has a pair of spaced apart slots 88 which are associated with the tongue 22. The locking plate 86 also has a pair of spaced apart recesses 89 which accommodate spring bias members 90. The spring bias members 90 register in the heart-shaped slots 44.

A lower tongue plate 92 has a generally rectangular cutout 94 with side edges corresponding to the profile of the lap belt tongue section 22. A bottom plate 96, the tongue plate 92 and the locking plate 86 combine to define a tongue receiving section for slidably receiving the lap belt tongue section 22.

Suitable apertures are provided in the top plate 58, the upper tongue plate 52, the locking plate 46, the anchor plate 26, the lower locking plate 86, the lower tongue plate 92 and the bottom plate 96 to receive elongated threaded fasteners 98 which engage nuts 100 to provide the rigid buckle housing assembly 24.

As can best be seen in FIGURE 5, a pair of ball-shaped locking elements 102 are carried in the slots 88 of the locking plate 86 and have a diameter greater than the thickness of the plate 86 to extend into the guideway defined by the lower tongue plate 92. The locking elements 102 engage a pair of apertures 104 provided in the tongue section 22.

Now referring to FIGURES 5 and 6, the operation of the preferred buckle mechanism is as follows: insertion of the tongue section 22 into its corresponding guideway urges the locking elements 102 to an inner position wherein they abut the inner end of the slot 88 and register with the slot 42 in the release plate 34. Continued insertion of the tongue section 22 urges the locking element 102 against the bias of the spring member 78 and permits it to move to a lateral position permitting the tongue 22 to be fully inserted.

In the fully inserted position of the tongue 22, the apertures 104 of the tongue register with the lower portions of the locking elements 102 so that the spring members 78 urge the locking elements 102 downwardly into apertures 104. The application of a force tending to separate the tongue section 22 from the housing section 24 moves the locking element 102 to the position illustrated in FIGURE 5 wherein it is captured between the aperture 104 and the opposite extreme end of the slot 88 and retained against lateral movement by the release plate 34. In the captured position, the locking element 102 prevents separation of the tongue section 22 from the housing 24.

It can be seen that movement of the release plate 34 toward the right in FIGURE 5 brings the elongated slots 42 into registry with the captured locking elements 102 so that the locking elements 102 can move laterally out of engagement with the aperture 104 of the tongue 22. It is to be understood that the relative dimensions of the locking plate 86, and the tongue 22 and the locking element 102 are such that in the captured position a withdrawal force on the tongue 22 produces a net force on locking device 102 against the release plate 34 so that movement of the release plate toward a disengaging position permits the locking element 102 to move laterally out of a locking position.

In a similar manner, the locking elements 80 engage the tongue sections 20. Insertion of the tongue sections 20 in the housing 24 move the locking elements 80 to a position where they register with the slot 44 of the release plate thereby permitting lateral displacement of the locking element out of the tongue guideway and against the bias of the spring member 90. When the tongue section 20 has been fully inserted, the spring member 90 urges the locking elements 80 into engagement with the apertures 82 and 84 of the tongue section 20. The application of a force tending to separate the tongue 20 from the housing section 24 moves the locking elements 80 out of registry with the slot 44 of the release plate to a position wherein they are captured by the apertures 82 and 84 of the tongue and the release plate 34. Sliding movement of the release plate 34 to a position wherein the slot 44 registers with the captured locking element 80 permits lateral displacement of the locking element downwardly and out of engagement with the apertured tongue 20 to permit separation of the tongue 20 from the housing 24.

FIGURE 5 shows the locking elements 80 and 102 in their captured position and FIGURE 6 illustrates the simultaneous lateral displacement of the locking elements 80 and 102 out of engagement with their respective tongue sections.

FIGURE 7 illustrates a modified version of the preferred locking buckle mechanism wherein the pair of spherical locking elements 102 are replaced by a single roller element 106 and apertures 104 of tongue 22 replaced by a single elongated slot 108. The embodiment illustrated in FIGURE 7 differs in another respect in that the apertures 44 and 42 of the release plate 34 have been arranged so that each set of locking elements 80 and 106 are separately releasable. Thus, a downward force applied to the button 62 will actuate the release plate 34 to an extreme position wherein the locking elements 80 are permitted freedom for lateral movement toward a position where they release the tongue member 20.

It can therefore be seen that we have described an improved buckle mechanism employing locking means which in one form permits simultaneous release of a pair of tongue sections and in another form permits the individual release of a pair of tongue sections. The novel locking means employs a rotatable locking element movable between a first engaging position where it is free for lateral movement toward and away from the tongue receiving guideway and a second position wherein separation of the tongue from the housing section is prevented.

Although we have described but two preferred embodiments of our invention it is to be understood that various changes and modifications can be made therein without departing from the spirit of the invention as expressed in the scope of the appended claims.

We claim:

1. In a seat belt buckle assembly, the combination of:
   (a) a tongue having a socket formed therein;
   (b) a buckle having an opening for receiving said tongue, and means for guiding the tongue along a path of motion in the buckle as the tongue is inserted or removed through said opening;
   (c) a locking element engageable with the socket in said tongue, said locking element being supported in the buckle for motion between first and second interference positions along a line substantially parallel to the path of motion of the tongue, and for motion from said first and second interference positions to first and second non-interference positions respectively, along lines laterally directed with respect to the path of motion of said tongue, each of said interference positions being disposed in the path of motion of said tongue, each of said non-interference positions being disposed out of the path of motion of said tongue, and the second interference position being spaced from the first interference position in the direction of removal of the tongue from the buckle;
   (d) bias means for urging the locking element toward the path of motion of said tongue from the first non-interference position;
   (e) restraining means for preventing motion of the locking element from its second interference position to its second non-interference position; and
   (f) manually actuable means for disabling said restraining means, whereby insertion of the tongue in the buckle establishes an engagement between the tongue and the locking element to move the locking element from its first interference position to its first non-interference position until the locking element is urged into the socket by said bias means, and motion of the tongue in the direction of removal from the buckle moves the locking element to its second interference position to prevent separation of the tongue from the buckle.

2. The combination as defined in claim 1, wherein the points of the locking element which contact the tongue have curvilinear cross-sections in a plane parallel to the path of motion of the tongue in the buckle.

3. The combination as defined in claim 1, wherein the locking element is a ball.

4. The combination as defined in claim 1, wherein the locking element is a roller.

5. The combination as defined in claim 1, wherein the means in said buckle for guiding the tongue along its path of motion include a member supported over the position occupied by the tongue when it engages the locking element, said member having a slot facing said position and extending parallel to the path of motion of the tongue and wherein said locking element is disposed in said slot for motion between a pair of spaced positions defined by the ends of said slot.

6. The combination as defined in claim 1, wherein the means in the buckle for guiding the tongue include means forming a guideway for receiving the tongue, said guideway forming means including a fixed plate overlapping the position occupied by the tongue when the tongue is engaged with the locking element said fixed plate having a slot facing the guideway and extending parallel to the path of motion of the tongue; said locking element is disposed in said slot and has a thickness greater than said fixed plate; and including a release plate supported in the buckle on the side of the fixed plate opposite the guideway for motion over the slot between a first position wherein it permits motion of the locking element away from the guideway from its second interference position, and a second position wherein it prevents motion of the locking element away from the guideway.

7. The combination as defined in claim 1, wherein the tongue is formed of a plate-like section and the socket in said tongue is formed by a perforation through the plate-like section.

8. The combination as defined in claim 1, wherein the tongue is formed of a section of plate with a portion of its perimeter having a predetermined profile, the buckle has a guideway for receiving said tongue, and including means in said guideway with a complementary profile engageable with the profiled perimeter of said tongue.

9. The combination as defined in claim 1, including a fixed plate in said buckle overlapping the tongue when the tongue is disposed in the buckle, said fixed plate having a slot extending parallel to the path of motion of the tongue, and wherein said locking element is disposed in the slot and has a thickness greater than the fixed plate, and said restraining means comprises a release plate slidably supported with respect to said fixed plate for motion parallel to the fixed plate, said release plate having a socket registering with the slot, the combined depth of the socket in the release plate and the thickness of the slot in said fixed plate being greater than the thickness of the locking element so that when the socket in the release plate and the locking element are in a common position with respect to the slot in the fixed plate, the locking element can move from one of its interference positions to one of its non-interference positions.

10. The combination as defined in claim 1, wherein said tongue has a pair of sockets formed in a predetermined orientation with respect to one another and said buckle has a pair of locking elements arranged in said predetermined orientation for engaging said pair of sockets so that the buckle will not lockingly engage a tongue inserted into said opening without sockets in said predetermined orientation.

11. The combination as defined in claim 9, including a pushbutton supported on said buckle for motion toward and away from the path of motion of said tongue and connected with said release plate to move the release plate in directions parallel to said path of motion.

12. In a seat belt buckle assembly, the combination comprising:
   (a) a tongue having a locking section;
   (b) a buckle having a planar section and an opening for receiving the tongue by a motion of the tongue through the opening, generally parallel to said planar section to a locking position;
   (c) locking means in said buckle engageable with the locking section on the tongue to lock the tongue in its locking position against motion parallel to the planar section toward the opening in the buckle, said locking means and said locking section being separable by relative motion between them in a direction normal to the planar section;
   (d) a release member supported in said buckle for motion in directions parallel to the planar section between a first position in which it is operative to maintain engagement of said locking means with the locking section of said tongue, and a second position in which it is inoperative to prevent separation of said locking means from the locking section of said tongue;
   (e) bias means in said buckle urging said release member toward its first position;
   (f) push button means supported on the buckle for motion toward and away from the planar section; and
   (g) means connecting said push button means with said release member so that motion of the push button toward the planar section moves the release member parallel to the planar section from its first position to its second position.

13. A seat belt buckle assembly as defined in claim 12, wherein said tongue is formed with a socket and the locking means in said buckle is engageable with the socket to restrict motion of the tongue parallel to the planar section from its locking position.

14. A seat belt buckle assembly as defined in claim 12, wherein the release member is supported in the buckle between the push button means and the planar section for motion between its first and second positions.

15. A seat belt buckle assembly as defined in claim 12, wherein the tongue is formed of a plate-like section and in its locking position is disposed in face-to-face relationship with the planar section.

16. A seat belt buckle assembly as defined in claim 15, wherein the planar section is supported in the buckle between the pushbutton means and at least one of the positions of the release member.

17. A seat belt buckle assembly as defined in claim 15, wherein the planar section is supported in the buckle between the pushbutton means and the release member, and the opening in the buckle is so positioned as to allow insertion of the tongue to its locking position between the planar section and the release member.

18. A seat belt buckle assembly as defined in claim 12, wherein the bias means urges the release member from its first position in a first direction parallel to the planar section, and motion of the pushbutton means toward the planar section moves the release member in the opposite direction.

19. A seat belt buckle assembly as defined in claim 12, wherein portions of the pushbutton means are slidably engageable with the release member and have a component of motion parallel to the planar section as the pushbutton means is moved toward the planar section.

20. In a seat belt buckle assembly the combination of:
 (a) a housing having a first guideway and a second guideway, said guideways being parallel and overlying one another,
 (b) a first tongue and a second tongue, each of said tongues having a planar section and said planar sections being receivable by said guideways,
 (c) movable locking means between said guideways and operable to lock said tongues in said guideways,
 (d) a movable plate member disposed intermediate said guideways and operable to lock and unlock said locking means,
 (e) means carried by said housing and engageable with said plate member for releasing said tongues from said guideways.

21. The combination as defined in claim 20 and wherein said last mentioned means includes a pushbutton movably supported on said housing and engageable with said plate member to release said first tongue from said guideway upon depression of said pushbutton a predetermined amount and to release said second tongue upon further depression of said pushbutton.

22. The combination as defined in claim 20 and in which each of said tongues has a portion of its perimeter formed with an individual configuration, said guideways being formed with a configuration complementary to an associated one of said tongues whereby each of said tongues is receivable in its associated guideway but not the other.

References Cited

UNITED STATES PATENTS

| | | | |
|---|---|---|---|
| 2,832,120 | 4/1958 | Jayet | 24—205.17 |
| 3,106,004 | 10/1963 | Davis | 24—205.17 |
| 3,228,080 | 1/1966 | Trauger. | |
| 3,241,205 | 3/1966 | Genin. | |
| 3,262,169 | 7/1966 | Jantzer. | |
| 3,270,387 | 9/1966 | Ziegler. | |
| 3,331,108 | 7/1967 | Fisher. | |

FOREIGN PATENTS

| | | |
|---|---|---|
| 117,092 | 6/1918 | Great Britain. |
| 678,171 | 7/1939 | Germany. |
| 847,174 | 9/1960 | Great Britain. |
| 301,320 | 9/1932 | Italy. |
| 728,533 | 7/1932 | France. |

BERNARD A. GELAK, Primary Examiner

U.S. Cl. X.R.

24—205.19, 230; 244—151; 297—389